US011727091B2

(12) United States Patent
Singh et al.

(10) Patent No.: US 11,727,091 B2
(45) Date of Patent: Aug. 15, 2023

(54) METHOD AND SYSTEM FOR TRAINING MACHINE LEARNING MODELS ON SENSOR NODES

(71) Applicant: QEEXO, CO., San Jose, CA (US)

(72) Inventors: Karanpreet Singh, Aspinwall, PA (US); Rajen Bhatt, McDonald, PA (US)

(73) Assignee: Qeexo, Co., San Jose, CA (US)

( * ) Notice: Subject to any disclaimer, the term of this patent is extended or adjusted under 35 U.S.C. 154(b) by 0 days.

(21) Appl. No.: 17/469,439

(22) Filed: Sep. 8, 2021

(65) Prior Publication Data

US 2022/0083823 A1   Mar. 17, 2022

Related U.S. Application Data

(60) Provisional application No. 63/077,338, filed on Sep. 11, 2020.

(51) Int. Cl.
*G06F 18/2433* (2023.01)
*G08B 21/18* (2006.01)
*G06F 18/2413* (2023.01)

(52) U.S. Cl.
CPC ...... *G06F 18/2433* (2023.01); *G06F 18/2413* (2023.01); *G08B 21/182* (2013.01)

(58) Field of Classification Search
CPC .... G06K 9/6284; G06K 9/627; G08B 21/182; G05B 23/0254; G06N 20/00
See application file for complete search history.

(56) References Cited

U.S. PATENT DOCUMENTS

| | | | | |
|---|---|---|---|---|
| 11,151,852 | B2* | 10/2021 | Anderson | G08B 21/182 |
| 2014/0351642 | A1* | 11/2014 | Bates | G06F 11/2257 |
| | | | | 714/26 |
| 2015/0295945 | A1* | 10/2015 | Canzanese, Jr. | G06F 21/55 |
| | | | | 726/23 |
| 2018/0306609 | A1* | 10/2018 | Agarwal | G01D 5/00 |
| 2019/0041484 | A1* | 2/2019 | Mishra | H04L 67/125 |
| 2019/0148010 | A1* | 5/2019 | Aliamiri | A61B 5/0002 |
| | | | | 705/2 |
| 2019/0235482 | A1 | 8/2019 | Subramaniyan | |
| 2020/0082296 | A1* | 3/2020 | Fly | G06F 17/18 |

(Continued)

FOREIGN PATENT DOCUMENTS

EP    1609033 B1    10/2012

OTHER PUBLICATIONS

International Search Report and Written Opinion for App. No. PCT/US2021/049431, dated Jan. 4, 2022, 14 pages.

*Primary Examiner* — Ojiako K Nwugo
(74) *Attorney, Agent, or Firm* — Kwan & Olynick LLP

(57) ABSTRACT

Disclosed are apparatus and methods for automatically training a sensor node to detect anomalies in an environment. At the sensor node, an indication is received to initiate training by the sensor node to detect anomalies in the environment based on sensor data generated by a sensor that resides on such sensor node and is operable to detect sensor signals from the environment. After training is initiated, the sensor node automatically trains a model that resides on the sensor to detect anomalies in the environment, and such training is based on the sensor data. After the model is trained, the model to detect anomalies in the environment is executed by the sensor node.

19 Claims, 5 Drawing Sheets

(56) References Cited

U.S. PATENT DOCUMENTS

| | | | | |
|---|---|---|---|---|
| 2020/0334979 | A1* | 10/2020 | Gonçalves | G08G 1/0129 |
| 2021/0051465 | A1* | 2/2021 | Koshy | H04W 64/006 |
| 2021/0306578 | A1* | 9/2021 | Xiong | G06N 20/00 |
| 2022/0005332 | A1* | 1/2022 | Metzler | G08B 13/19647 |
| 2022/0335337 | A1* | 10/2022 | Kovács | G06N 20/00 |

* cited by examiner

METHOD AND SYSTEM FOR TRAINING MACHINE LEARNING MODELS ON SENSOR NODES

RELATED APPLICATIONS

The subject patent application claims priority to U.S. Provisional Patent Application No. 63/077,338 filed Sep. 11, 2020, which application is herein incorporated by reference in its entirety for all purposes.

TECHNICAL FIELD OF THE INVENTION

The invention generally relates to sensing technology for detecting anomalies in the environment, and more specifically, it relates to the training of anomaly detection models on low-power sensor systems.

BACKGROUND

Developing and training machine learning applications for sensor modules is labor-intensive, time-consuming, and requires and multitude of individuals with the technical expertise to implement such applications with any level of commercially viable performance.

Custom models for detecting anomalies may be trained and deployed in various sensor modules in a diverse number of environments. Different sensor types often are setup to detect different physical phenomenon, such as audio signals, pressure readings, temperatures, etc. The same type of sensor for detecting the same signal type may be placed at different positions within a same room and collect different sensor data based on their different locations. For instance, ultrasonic sensors placed within an industrial environment may collect different audio signals from the various machines, depending on position relative to such machines. Each sensor could be configured to detect anomalies based on its own received signal, which would typically represent a combination of audio signals from the machines placed at different positions in the environment. Any change in the environment would also entail reconfiguring of the sensor module.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of automatically training a sensor node to detect anomalies in an environment is disclosed. At the sensor node an indication is received to initiate training by the sensor node to detect anomalies in the environment based on sensor data generated by a sensor that resides on such sensor node and is operable to detect sensor signals from the environment. After training is initiated, the sensor node automatically trains a model that resides on the sensor to detect anomalies in the environment, and such training is based on the sensor data. After the model is trained, the model to detect anomalies in the environment is executed by the sensor node.

In a specific implementation, the sensor node further comprises a controller for initiating training and execution of the model, and the model is trained without being generated by a processor that is external to the sensor node. In another embodiment, the operations for receiving, training, and executing are repeated for a plurality of different sensor nodes. In a further aspect, the different sensor nodes reside in different environments.

In another example, the indication to initiate training is received via a user activating a physical input mechanism of the sensor node. In another aspect, the indication to initiate training is received as a command by the sensor node. In another implementation, the model is trained to detect anomalies in one or more objects in the environment, and the sensor is a motion sensor, acoustic sensor, touch sensor, environmental sensor, or vision sensor. In yet another embodiment, the model is trained to detect anomalies in a machine in the environment, and the sensor node is positioned proximate to the machine. In another example, the indication to initiate training is received after the sensor node is moved to the environment for a duration of time in which the sensor detects sensor signals that do not indicate an anomaly.

In another embodiment, an anomaly in the environment is detected during execution of the model, and the sensor node requests confirmation of the detected anomaly. The training by the sensor node is repeated if the detected anomaly is not confirmed. The model to detect anomalies is continued to be executed if the detected anomaly is confirmed.

In an alternative embodiment, the invention pertains to a sensor node system having sensor operable to detect sensor signals from the environment and generate sensor data based on such sensor signals. This system includes a controller operable for performing any combination of the above-described operations. In another embodiment, the invention pertains to a machine-readable medium, comprising executable instructions that, when executed by a processor, facilitate performance of any combination of the above-described operations.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some of these specific details. In other instances, well known process operations have not been described in detail to not unnecessarily obscure the present invention. While the invention will be described in conjunction with the specific embodiments, it will be understood that it is not intended to limit the invention to the embodiments.

Training a sensor module/node can be accomplished offline before or after the sensor node is deployed in its target environment, such as on a factory floor in an industrial application. The sensor node can be coupled to a computer via a wired or wireless connection and an anomaly model is then trained based on training sensor data that is provided for the coupled sensor node. The model can be adjusted until anomalies with respect to the training sensor data are accurately detected by the model. After training, the model can then be deployed and executed by a sensor node in its target environment. For example, a model can be pushed onto a specific sensor node deployed in the environment to detect anomalies.

Certain embodiments of the present invention provide automation of training on the sensor module/node itself while the sensor node is deployed in its target environment. That is, the sensor node is configured to train a model that resides on the sensor node itself without the model being generated by an external computer that is coupled to the sensor node via a hardwired or wireless connection or without being generated by cloud computing systems.

In a non-limiting aspect, the automated training can be targeted to work on cheap microcontrollers that use extraordinarily little energy, that rely on microcontrollers low-power computing, rather than radio communications off-loading the training to cloud computers. In general, a target sensor node can be categorized as system-on-module containing one or more microcontrollers and one or more sensors used in applications such as, but not limited to, the Internet of Things (IoT), Industry 4.0, Smart environments, Security and surveillance, and Smart touch devices, and so on, without limitation.

Figure 1:
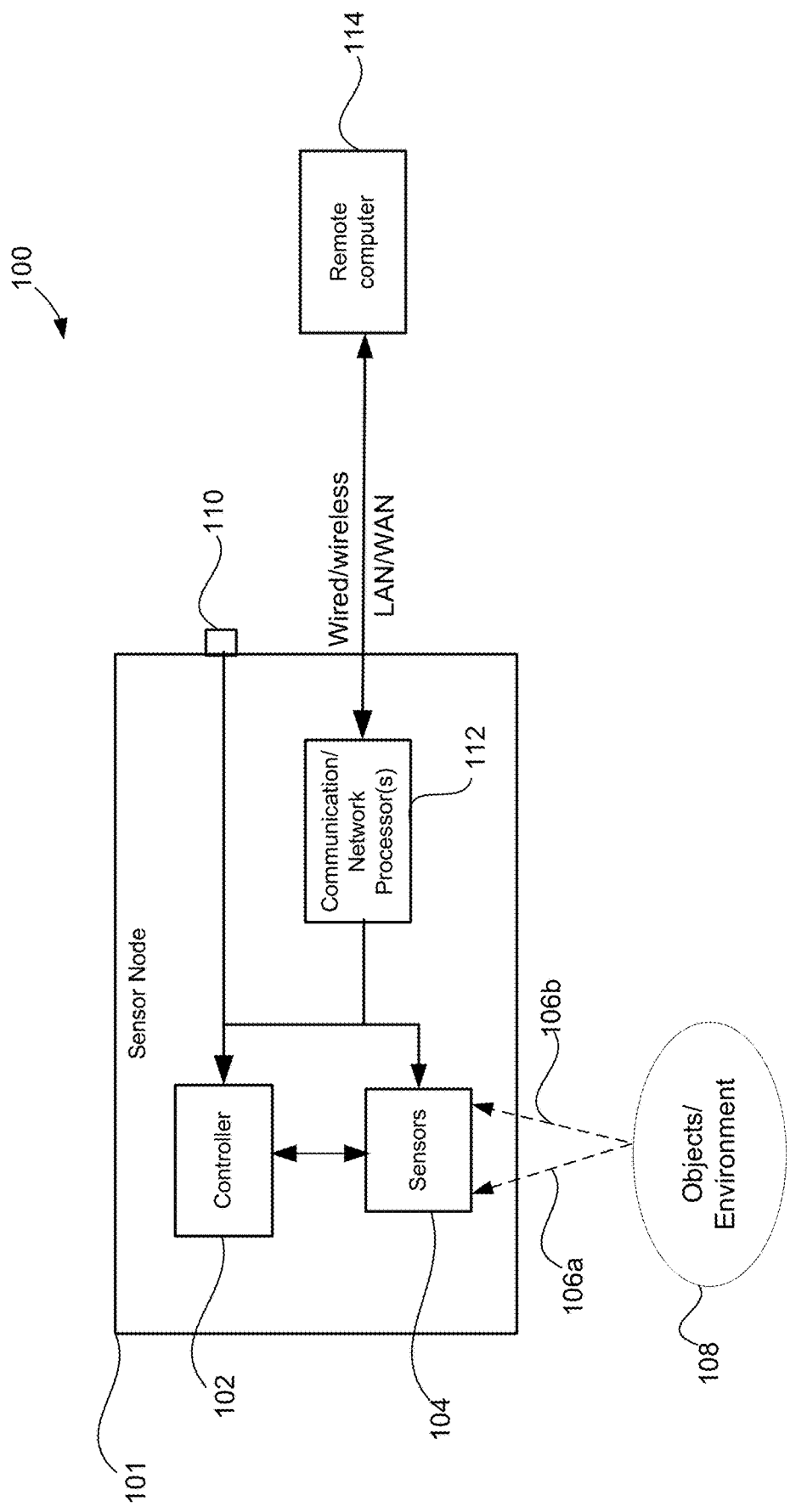
FIG. 1 is a diagrammatic representation of an automated training system for training a sensor node to detect anomalies in accordance with one embodiment of the present invention.

FIG. 1 is a diagrammatic representation of an automated training system 100 for training a sensor node 101 to detect anomalies in accordance with one embodiment of the present invention. In general, the automated training system 100 can include a sensor node 101 although it is contemplated that multiple sensing nodes may be trained at once or sequentially in the same or different environments. A sensing node 101 may include one or more sensors 104, a controller 102, and one or more communication/network processor(s) 112. The sensing node may also have a physical input mechanism 110, such as button, for activating automatic machine learning for anomaly detection as described further below.

The controller 102 can be operable to control operation of the sensors 104 and receive sensed data from such sensors. The sensors are operable to detect various signals (e.g., 106a and 106b) from objects and/or the environment 108. The sensor devices may also include components that output signals, such as ultrasonic or other audio signals (e.g., via a speaker device), to interact with the environment, and result in signals that are reflected/scattered from objects and sensed by another sensor component (e.g., microphone).

Certain embodiments of the present invention may be implemented with respect to any suitable type and number of sensors. Some non-limiting examples of the widely used sensors for these fields include, but are not limited to, motion sensors (accelerometer, gyroscope, magnetometer), acoustic sensors (microphone, ultrasound, geophone), touch screen sensors (capacitive, IR), environmental sensors (temperature, humidity, pressure, illumination, particulate), and vision sensors. That is, certain embodiments of the present invention may be practiced with respect to any suitable type and number of sensor and sensor data.

The sensor node 101 and its components may communicate with one or more remote computers 114 via any suitable type and number of communication interface devices, such as communication/network processor(s) 112. In general, the sensor node 101 can operate in a networked environment using logical connections via wired and/or wireless communications to one or more remote computers, such as a remote computer 114. The communication/network processor 112 and controller may form a single controller or microcontroller (MCU) device. The remote computer 114 can be a workstation, a server computer, a router, a personal computer, portable computer, microprocessor-based entertainment appliance, a peer device or other common network node.

The logical connections depicted include wired/wireless connectivity to a local area network (LAN) and/or larger networks, e.g., a wide area network (WAN). Such LAN and WAN networking environments are commonplace in offices and companies, and facilitate enterprise-wide computer networks, such as intranets, all of which can connect to a global communications network, e.g., the Internet.

When used in a LAN networking environment, the communication processor 112 can operate to connect the sensor node 101 to the local network through a wired (e.g., USB) and/or wireless communication network interface or adapter. The communication processor 112 can facilitate wired or wireless communication to the LAN, which can also include a wireless access point (AP) disposed thereon for communicating with the communication processor 112 in a wireless mode.

When used in a WAN networking environment, the sensor node 101 or can be connected to a communications server on the WAN via other means for establishing communications over the WAN, such as by way of the Internet.

When used in either a LAN or WAN networking environment, the sensing node 101 can access cloud storage systems or other network-based storage systems. Generally, a connection between the sensor node 101 and a cloud storage system can be established over a LAN or WAN e.g., by the communication processor 112.

The sensor node 101 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices. In one example, the communication processor(s) 112 may include a local communication processor (e.g., Bluetooth network processor) for interfacing locally with other systems, such as a smartphone or computer.

One specific sensor node comprises an SensorTile STEVAL-STLCS01V1 (available from STMicroelectronics of Geneva, Switzerland) described as comprising STM32L476—32-bit ultra-low-power MCU (microcontroller unit) with Cortex®M4F, an LSM6DSM—iNEMO inertial module with 3D accelerometer and 3D gyroscope, LSM303AGR—Ultra-compact high-performance eCompass module: ultra-low power 3D accelerometer and 3D magnetometer, LPS22HB—MEMS nano pressure sensor with 260-1260 hPa absolute digital output barometer, temperature sensor, MP34DT04—64 dB SNR digital MEMS microphone, and a BlueNRG-MS—Bluetooth low energy network processor. Although specific target sensor nodes and sensors are described herein, it is to be understood that various embodiments described herein can be implemented with respect to any configuration of target sensor node.

Figure 2:
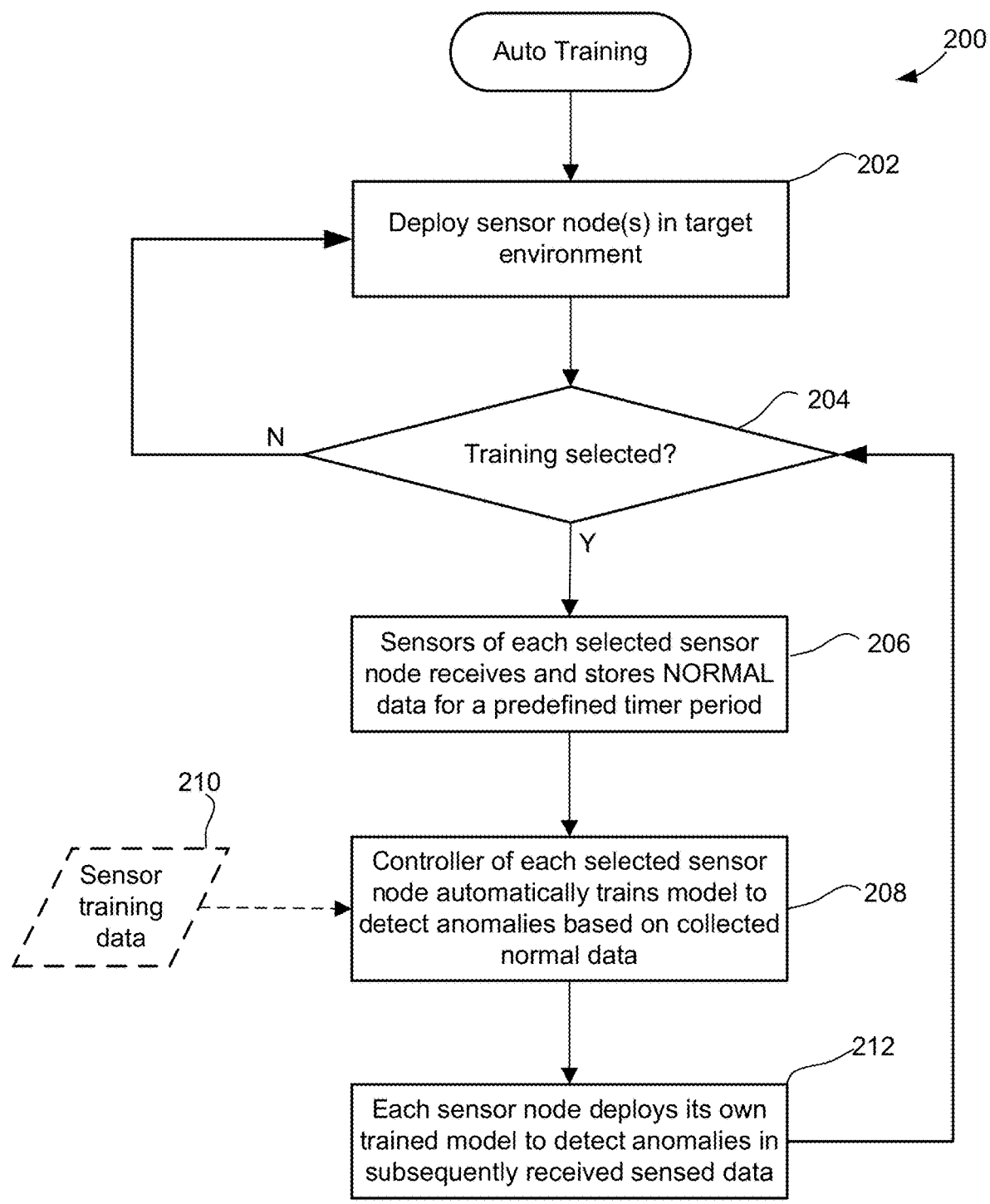
FIG. 2 is a flow chart illustrating an automated training process for sensor nodes in accordance with one embodiment of the present invention.

FIG. 2 is a flow chart illustrating an automated training process 200 for sensor nodes in accordance with one embodiment of the present invention. Initially, one or more sensor nodes are deployed in a target environment in operation 202. This process 200 will be described in conjunction with the example sensor node 101 of FIG. 1 although other sensor nodes are also contemplated. In a deployment example, sensor node 101 may be affixed in at a particular position in an industrial setting, such as an automobile manufacturing setting. Multiple sensor nodes 101 may be deployed and affixed in different positions within the environment. For instance, a first sensor node can be positioned near a particular machine component, while a second sensor node is positioned near a different machine component. In these examples, the sensor nodes are operable to detect anomalies in such machines.

Each sensor node may be permanently or temporarily affixed at its target position. For instance, a sensor node may be affixed to a machine, wall, cabinet, etc. directly (e.g., via glue) or within a holder that is removable (e.g., via fasteners such as screw, nails, bolts, etc.). Alternatively, a sensor node may simply be placed at its position (e.g., on a table, cabinet, shelf, etc.). Regardless of the particular placement mechanism, the sensor nodes can be repositioned within the environment or moved to a new environment since all or some of the sensor nodes can be easily retrained when their positions change as further described below.

Referring to the process 200 of FIG. 2, it may then be determined whether training has been selected in operation 204. Training selection may occur in any suitable manner. In the illustrated example, pushing the physical button 110 of a sensor node 101 starts the training process for such sensor node 101. When a user initially pushes the physical button 110, the controller 101 may be configured to determine that training has been selected. In this example, a user may push the training button on each sensor node that is deployed in a particular setting and is to undergo training.

In other embodiments, a virtual button may be pushed by sending a "start training" command to each sensor node via a wired or wireless connection. For instance, multiple sensor nodes may be placed at different locations, and a virtual button for a selected set of target sensor nodes is "pushed" to commence training via a command that is sent to the selected target sensor nodes from another device, such as a smartphone via Bluetooth. The sensor nodes do not need to be located within a same environment to be trained. For example, a remote server can send a "start training" command to selected sensor nodes that are deployed at various geographical locations. In this example, a user can select specific sensor nodes to receive a "start training" command, and each selected sensor node then simultaneously or sequentially receives a "start training" command. For instance, a user may send commands with identifiers corresponding to the selected sensor nodes. Preferably, all the sensor nodes that are newly deployed in the same environment receive their "start training" command at about the same time.

Prior to initiating training in one or more sensor nodes, the user may determine that there are no anomalies present in such environment. In one example, after deployment and startup of new sensor nodes in a particular environment, the user may assume that the time period immediately after the startup of the new sensor nodes contains no anomalies and, therefore, activate the training mode by selection of the physical or virtual "training" button within a predetermined time of startup (e.g., within 30 seconds, within 60 seconds, or within X minutes).

If training has not been selected, the sensor node(s) may be repositioned or kept in place until training is selected. Once training is selected, training may commence automatically without further intervention or input by a user or operator.

Once training is selected, the sensors 104 of each selected sensor node 101 may then operate to receive and store normal data for a predefined time period in operation 206. That is, each sensor 104 is operable to observe the environment and its associated controller will wait until some amount of normal data is collected. In one example, a second push of the physical/virtual button (110) specifies that the normal data collection is complete. That is, the user may decide how long to collect normal data. Alternatively, a predefined time period for normal data collection may be programmed for each sensor node 101 and/or sensor 104, e.g., by the user or by the sensor node manufacturer.

The controller 102 of each selected sensor node 101 can then automatically train one or more model(s) for each sensor to detect anomalies based on the collected normal data in operation 208. It is understood that a single model or multiple models may be trained for each sensor node and its sensors. In one example, a model is trained for each sensor. This training process may also utilize provided sensor training data (210) that includes sensor data for indicating normal data and/or anomaly data. In certain embodiments, data does not have to be sent between the controller and a remote server, e.g., via the Cloud or a USB connection. That is, certain embodiments provide a completely autonomous training for each sensor of a sensor node.

Figure 3:
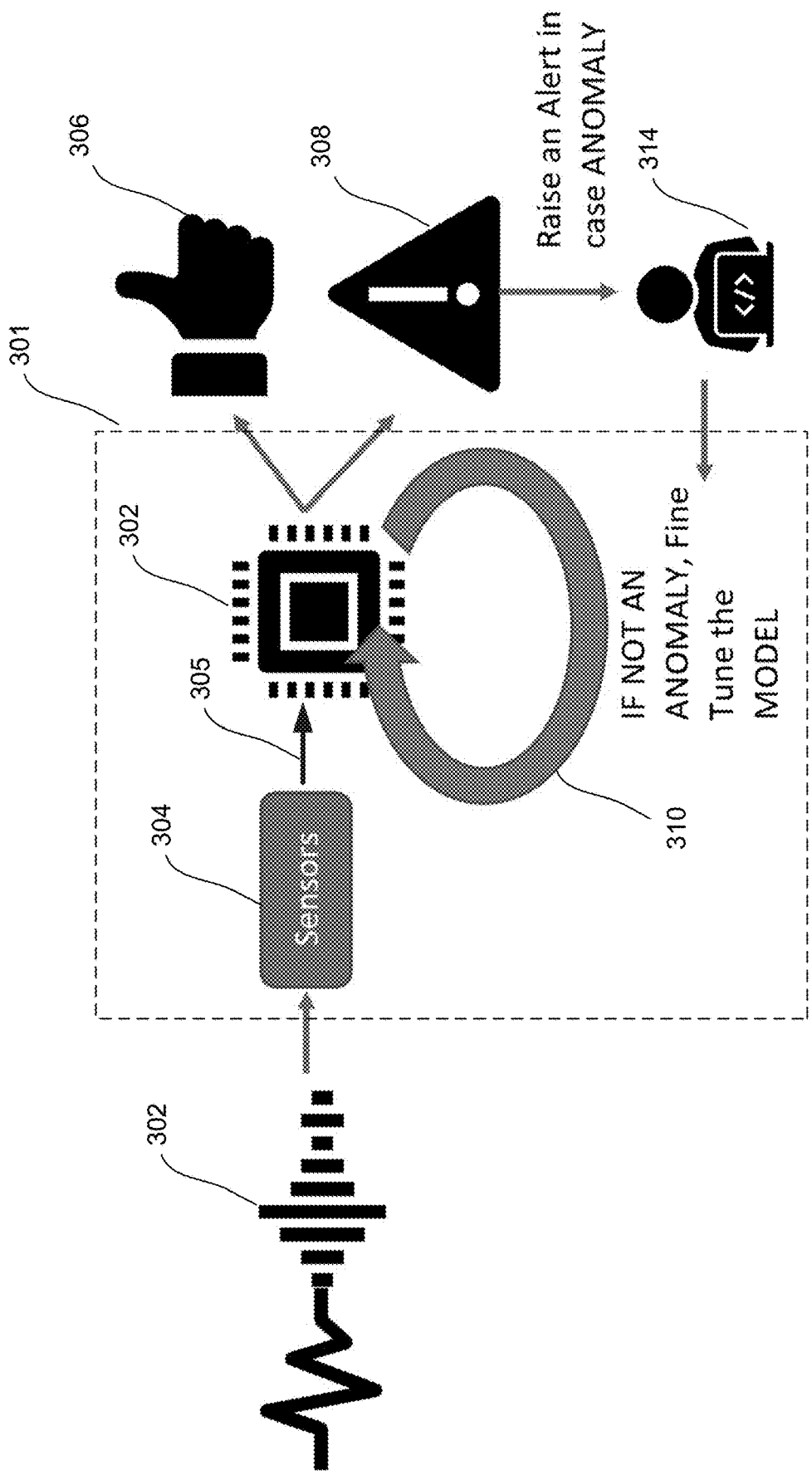
FIG. 3 is a simplified diagram of an automated anomaly detection system in accordance with a specific embodiment of the present invention.
Figure 4:
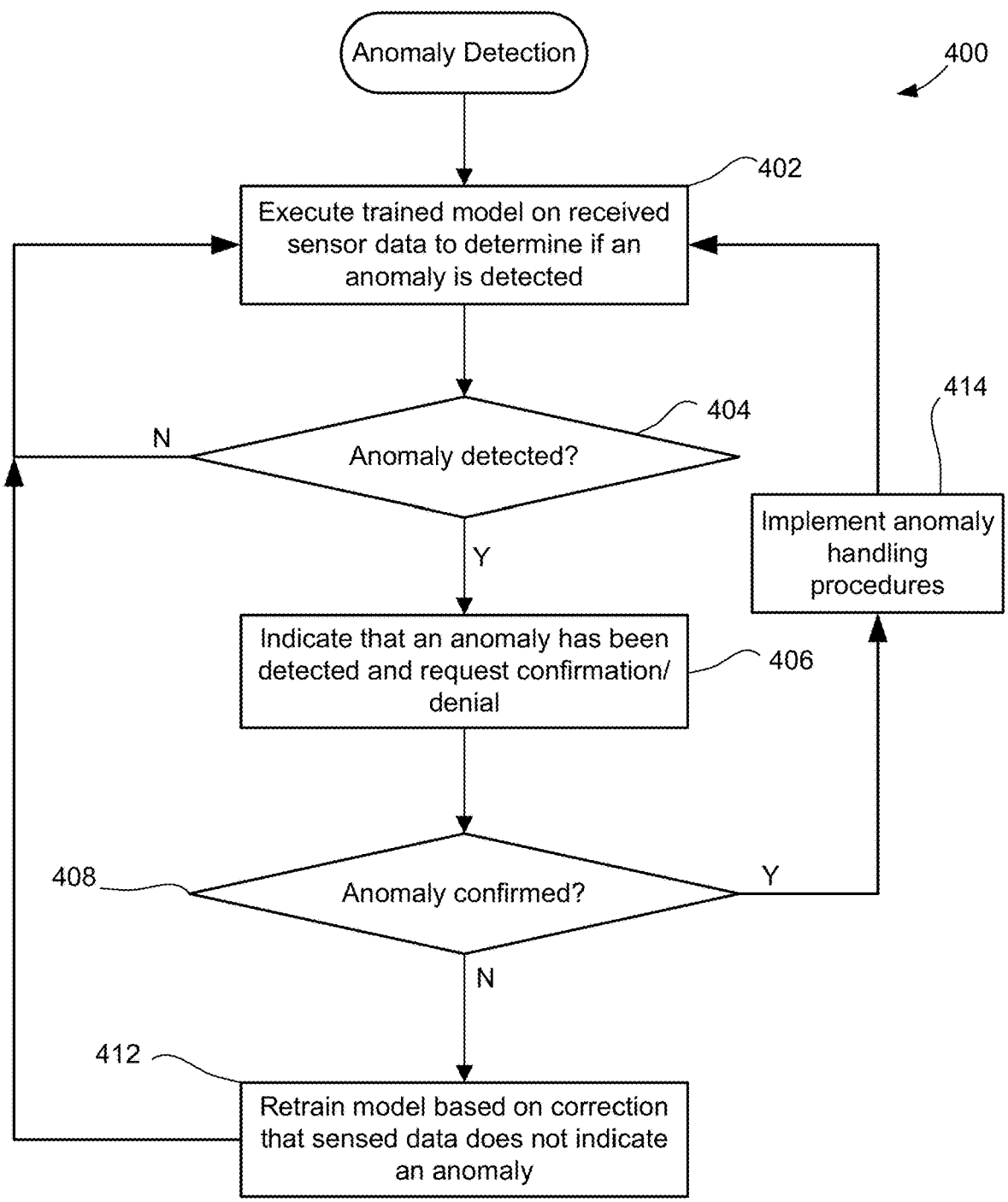
FIG. 4 is a flow chart illustrating an automated anomaly detection process in accordance with one embodiment of the present invention.

After the training is done, each sensor node can then deploy its own trained model(s) to detect anomalies in subsequently received sensed data in operation 212. The process for training may be repeated as needed to provide accurate detection of anomalies FIG. 3 is a simplified diagram of an automated anomaly detection system 300 in accordance with a specific embodiment of the present invention. FIG. 4 is a flow chart illustrating an automated anomaly detection process 400 in accordance with one embodiment of the present invention. FIGS. 3 and 4 will be described together.

After training of the sensor node 301 (e.g., by the controller 302), the controller 302 can then use the trained model(s) to determine whether sensed data 305 (e.g., generated from signals 302 received by sensor(s) 304) indicates anomaly data or normal data. In the illustrated example of FIG. 4, the trained model is executed on received data to determine if an anomaly is detected in operation 402.

It may then be determined whether an anomaly is detected in operation 404. That is, the trained model is configured to receive sensor data (305) from one or more sensor(s) and output whether the data indicates normal data or anomaly data. If no anomaly is detected, the trained model may continue to be executed on received sensor data in operation 402. An indication of normal data 306 may also be issued to an operator via a remote processor 314.

If an anomaly is detected, a report or alarm may be issued to the operator/technician. In one embodiment, it may be indicted that an anomaly has been detected and request confirmation or denial of such anomaly in operation 406. For instance, the operator may be presented with a request for confirming whether the detected anomaly is a real or a false alarm. If the operator confirms the anomaly, the anomaly detection process can continue without changes to the trained model(s). As illustrated, anomaly handling procedures may also be implemented in operation 414.

If the operator indicates "no anomaly", the model(s) can then be fine-tuned, e.g., on the controller, by repeating the training process of FIG. 2. As illustrated, the model can be retrained (and deployed) based on a correction that the sensed data does not indicate an anomaly in operation 412. The retrained model may then be executed again in operation 402.

The above-described techniques for training automation can be implemented with respect to any suitable anomaly model. Such anomaly model may be developed in any suitable manner. A more automated machine learning approach can provide and/or facilitate efficient and reusable solutions that capture the inferences, characterizations, and lessons developed in prior work, and continue to necessitate using the same set of costly highly technically competent human resources to develop the next machine learning application.

In non-limiting embodiments, the disclosed subject matter relates to machine learning (ML) applications and services and, more specifically, relates to target board, platform, sensor data and ML model agnostic automation platform for the generation of ML applications on commodity low-power systems on module hardware platforms. Thus, the disclosed subject matter can comprise systems and methods for the auto generation of ML applications on commodity low-power systems on module hardware platforms, regardless of the sensor data, target board, platform, sensor data and ML model.

To the foregoing and related ends, systems, devices, and methods are disclosed that can facilitate creating and using of ML applications on virtually any target board according to various aspects of the disclosed subject matter, among other related functions. In addition, further exemplary implementations are directed to other exemplary methods, and associated systems, devices and/or other articles of manufacture that facilitate auto generation of ML applications, as further detailed herein.

As described above, although conventional processes for developing ML applications on commodity low-power systems on module hardware platforms may be able to provide one-off, non-reusable solutions, etc., such efforts fail to provide and/or facilitate efficient and reusable solutions that capture the inferences, characterizations, and lessons developed in prior work, and continue to necessitate using the same set of costly highly technically competent human resources to develop the next ML application, among other deficiencies.

For instance, billions of sensors are collecting data on every device imaginable. Various embodiments described herein, can facilitate the auto generation of ML applications for every sensor in a complex system to discover knowledge, make predictions, and generate actionable insights at the microcontroller level.

As further described above, conventional processes for developing ML for edge devices is complex. Existing machine learning tools and platforms require deep technical knowledge to achieve commercial performance, for which there is a shortage of machine learning experts who can effectively bridge the gap from the lab to the real world. It is labor-intensive and time-consuming, due to inefficient tools and the nature of machine learning for edge devices, such that even experts take a long time to optimize machine learning models that need to function in the field. In addition, edge sensor data is under-utilized resulting in lost opportunities, at least because machine learning at the edge is subject to highly-constrained environments, sensor data common at the edge is often unintuitive, and it requires signal processing expertise unlike, e.g., image data.

Various embodiments of the disclosed subject matter can be configured to automate and/or facilitate the automation of all the stages typically required for building and deploying machine learning (ML) applications for target sensors and/or target boards comprising target sensors and microcontrollers.

In general, ML applications and target sensors may be used to detect various states, including an anomalous state, of any suitable object. One example auto-generated ML application uses target board vibration sensor data to discriminate between a normal function of fan or an anomalous damaged or interrupted state of such fan, and further uses a target board's communications capabilities to facilitate real-time indication of operational state and failure prediction based on the auto-generated ML model operating at the target board. In another application, vibration sensor data can be used to discriminate between a user knocking on a wall near a light at a certain periodicity and other anomalous noise to control the light's state on and off.

In other examples, the auto-generated ML application may use target board sensor data (e.g., vibration sensor data, motion sensor data, acoustic sensor data, etc.) to discriminate between various motion, position, and orientation states. The application may also report those states and other anomalous sensed impacts that are beyond thresholds, and further use a target board's communications capabilities to facilitate real-time tracking of a package based on the auto-generated ML model operating at the target board. For instance, the identified package states may include a resting state (including upright or not upright), a moving state, or an anomalous airborne/dropped state.

The auto-generated ML application may also use target board sensor data (e.g., vibration sensor data, acoustic sensor data, etc.) to discriminate between on-off states of various machines, reports those states, and further uses target board's communications capabilities to facilitate real-time tracking of such machines based on the auto-generated ML model operating at the target board.

Figure 5:
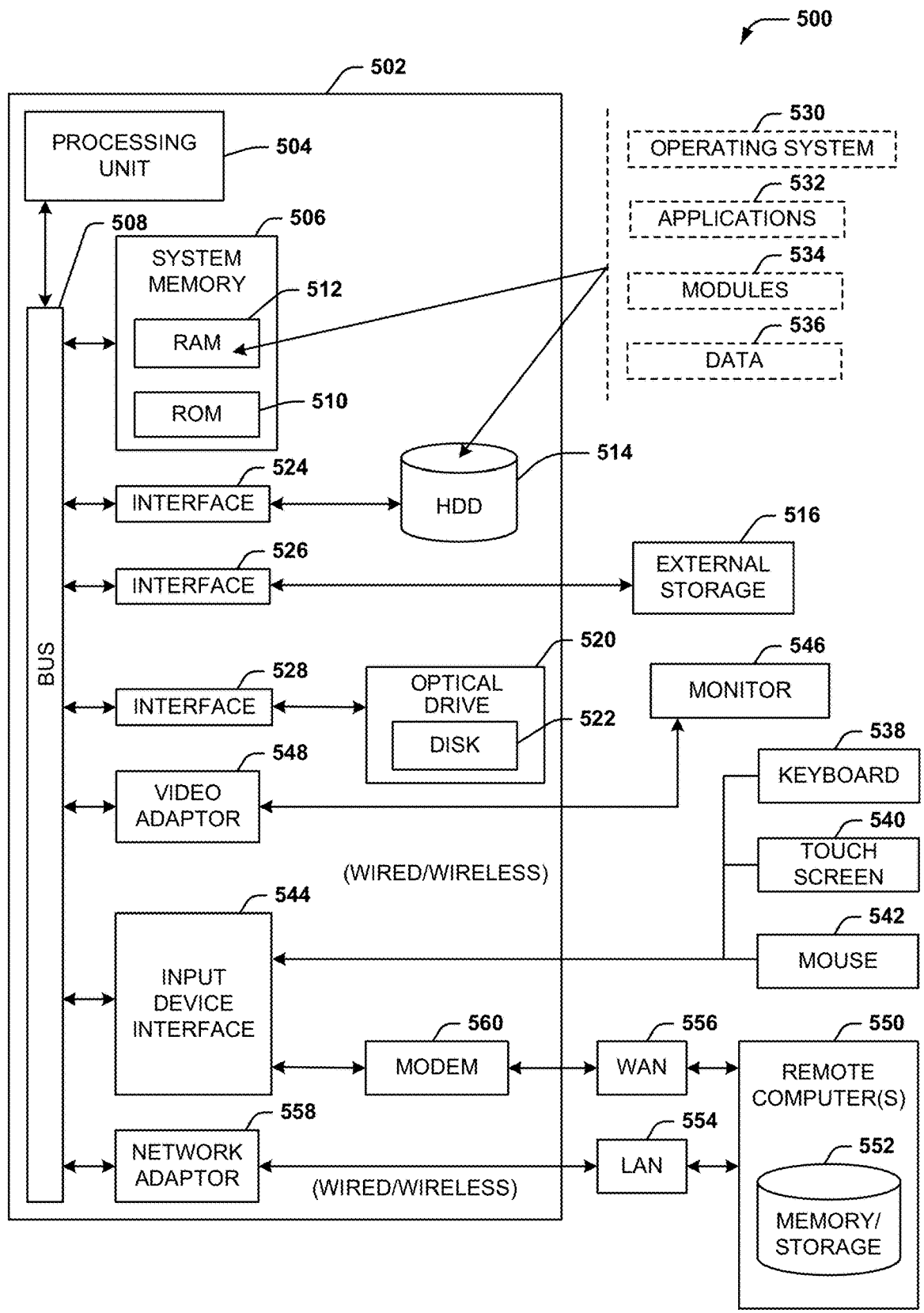
FIG. 5 depicts a block diagram representing an exemplary non-limiting networked computing system or operating environment in which one or more aspects of various embodiments described herein can be implemented

FIG. 5 depicts a block diagram representing an exemplary non-limiting networked computing system or operating environment in which one or more aspects of various embodiments described herein can be implemented.

One of ordinary skill in the art can appreciate that the various embodiments of the disclosed subject matter and related systems, devices, and/or methods described herein can be implemented in connection with any computer or other client or server device, which can be deployed as part of a communications system, a computer network, and/or in a distributed computing environment, and can be connected to any kind of data store. In this regard, the various embodiments described herein can be implemented in any computer system or environment having any number of memory or storage units, and any number of applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by communicative exchange among computing devices and systems. These resources and services can include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices can have applications, objects or resources that may utilize disclosed and related systems, devices, and/or methods as described for various embodiments of the subject disclosure.

In order to provide additional context for various embodiments described herein, FIG. 5 and the following discussion are intended to provide a brief, general description of a suitable computing environment 500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 5, the example environment 500 for implementing various embodiments of the aspects described herein includes a computer 502, the computer 502 including a processing unit 504, a system memory 506 and a system bus 508. The system bus 508 couples system components including, but not limited to, the system memory 506 to the processing unit 504. The processing unit 504 can be any of various commercially available processors. Dual microprocessors and other multi processor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 includes ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also include a high-speed RAM such as static RAM for caching data.

The computer 502 further includes an internal hard disk drive (HDD) 514 (e.g., EIDE, SATA), one or more external storage devices 516 (e.g., a magnetic floppy disk drive (FDD) 516, a memory stick or flash drive reader, a memory card reader, etc.) and an optical disk drive 520 (e.g., which can read or write from a CD-ROM disc, a DVD, a BD, etc.). While the internal HDD 514 is illustrated as located within the computer 502, the internal HDD 514 can also be configured for external use in a suitable chassis (not shown). Additionally, while not shown in environment 500, a solid state drive (SSD) could be used in addition to, or in place of, an HDD 514. The HDD 514, external storage device(s) 516 and optical disk drive 520 can be connected to the system bus 508 by an HDD interface 524, an external storage interface 526 and an optical drive interface 528, respectively. The interface 524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 512, including an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

Computer 502 can optionally comprise emulation technologies. For example, a hypervisor (not shown) or other intermediary can emulate a hardware environment for operating system 530, and the emulated hardware can optionally be different from the hardware illustrated in FIG. 5. In such an embodiment, operating system 530 can comprise one virtual machine (VM) of multiple VMs hosted at computer 502. Furthermore, operating system 530 can provide runtime environments, such as the Java runtime environment or the .NET framework, for applications 532. Runtime environments are consistent execution environments that allow applications 532 to run on any operating system that includes the runtime environment. Similarly, operating system 530 can support containers, and applications 532 can be in the form of containers, which are lightweight, standalone, executable packages of software that include, e.g., code, runtime, system tools, system libraries and settings for an application.

Further, computer 502 can be enable with a security module, such as a trusted processing module (TPM). For instance with a TPM, boot components hash next in time boot components, and wait for a match of results to secured values, before loading a next boot component. This process can take place at any layer in the code execution stack of computer 502, e.g., applied at the application execution level or at the operating system (OS) kernel level, thereby enabling security at any level of code execution.

A user can enter commands and information into the computer 502 through one or more wired/wireless input devices, e.g., a keyboard 538, a touch screen 540, and a pointing device, such as a mouse 542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 504 through an input device interface 544 that can be coupled to the system bus 508, but can be connected by other interfaces, such as a parallel port, an IEEE 1394 serial port, a game port, a USB port, an IR interface, a BLUETOOTH® interface, etc.

A monitor 546 or other type of display device can be also connected to the system bus 508 via an interface, such as a video adapter 548. In addition to the monitor 546, a computer typically includes other peripheral output devices (not shown), such as speakers, printers, etc.

The computer 502 can operate in a networked environment using logical connections via wired and/or wireless communications to one or more remote computers, such as a remote computer(s) 550. The remote computer(s) 550 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 552 is illustrated. The logical connections depicted include wired/wireless connectivity to a local area network (LAN) 554 and/or larger networks, e.g., a wide area network (WAN) 556. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the local network 554 through a wired and/or wireless communication network interface or adapter 558. The adapter 558 can facilitate wired or wireless communication to the LAN 554, which can also include a wireless access point (AP) disposed thereon for communicating with the adapter 558 in a wireless mode.

When used in a WAN networking environment, the computer 502 can include a modem 560 or can be connected to a communications server on the WAN 556 via other means for establishing communications over the WAN 556, such as by way of the Internet. The modem 560, which can be internal or external and a wired or wireless device, can be connected to the system bus 508 via the input device interface 544. In a networked environment, program modules depicted relative to the computer 502 or portions thereof, can be stored in the remote memory/storage device 552. It will be appreciated that the network connections shown are example and other means of establishing a communications link between the computers can be used.

When used in either a LAN or WAN networking environment, the computer 502 can access cloud storage systems or other network-based storage systems in addition to, or in place of, external storage devices 516 as described above. Generally, a connection between the computer 502 and a cloud storage system can be established over a LAN 554 or WAN 556 e.g., by the adapter 558 or modem 560, respectively. Upon connecting the computer 502 to an associated cloud storage system, the external storage interface 526 can, with the aid of the adapter 558 and/or modem 560, manage storage provided by the cloud storage system as it would other types of external storage. For instance, the external storage interface 526 can be configured to provide access to cloud storage sources as if those sources were physically connected to the computer 502.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise automatically generating optimized ML models for a specific target board, transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, storage and/or communications components, sensors, antennae, audio and/or visual output devices, other devices, etc.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) ...), smart cards, and flash memory devices (e.g., card, stick, key drive ... ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of automatically training a sensor node to detect anomalies in an environment, the method comprising:
    receiving at the sensor node an indication to initiate training by the sensor node to detect anomalies in the environment based on sensor data generated by a sensor that resides on such sensor node and is operable to detect sensor signals from the environment;
    after training is initiated, the sensor node automatically training a model that resides on the sensor to detect anomalies in the environment, wherein such training is based on the sensor data; and
    after the model is trained, executing by the sensor node the model to detect anomalies in the environment.

2. The method of claim 1, wherein the sensor node further comprises a controller for initiating training and execution of the model, and wherein the model is trained without being generated by a processor that is external to the sensor node.

3. The method of claim 1, further comprising repeating operations for receiving, training, and executing for a plurality of different sensor nodes.

4. The method of claim 3, wherein the different sensor nodes reside in different environments.

5. The method of claim 1, wherein the indication to initiate training is received via a user activating a physical input mechanism of the sensor node.

6. The method of claim 1, wherein the indication to initiate training is received as a command by the sensor node.

7. The method of claim 1, wherein the model is trained to detect anomalies in one or more objects in the environment, wherein the sensor is a motion sensor, acoustic sensor, touch sensor, environmental sensor, or vision sensor.

8. The method of claim 1, wherein the model is trained to detect anomalies in a machine in the environment, wherein the sensor node is positioned proximate to the machine.

9. The method of claim 1, wherein the indication to initiate training is received after the sensor node is moved to the environment for a duration of time in which the sensor detects sensor signals that do not indicate an anomaly.

10. The method of claim 1, further comprising:
    during execution of the model, detecting an anomaly in the environment;
    requesting by the sensor node confirmation of the detected anomaly;
    repeating the training by the sensor node if the detected anomaly is not confirmed; and
    continuing to execute the model to detect anomalies if the detected anomaly is confirmed.

11. A sensor node system for automatically training a model to detect anomalies in an environment, comprising:
    a sensor operable to detect sensor signals from the environment and generate sensor data based on such sensor signals; and
    a controller for receiving the sensor data from the sensor and performing the following operations:
        receiving an indication to initiate training by the sensor node system to detect anomalies in the environment based on sensor data generated by a sensor;
        after training is initiated, automatically training a model that resides on the sensor to detect anomalies in the environment, wherein such training is based on the sensor data; and
        after the model is trained, executing the model to detect anomalies in the environment.

12. The system of claim 11, wherein the model is trained without being generated by a processor that is external to the sensor node system.

13. The system of claim 11, wherein the indication to initiate training is received via a user activating a physical input mechanism of the sensor node system.

14. The system of claim 11, wherein the indication to initiate training is received as a command by the sensor node system.

15. The system of claim 11, wherein the model is trained to detect anomalies in one or more objects in the environment, wherein the sensor is a motion sensor, acoustic sensor, touch sensor, environmental sensor, or vision sensor.

16. The system of claim 11, wherein the model is trained to detect anomalies in a machine in the environment, wherein the sensor node system is positioned proximate to the machine.

17. The system of claim 11, wherein the indication to initiate training is received after the sensor node system is moved to the environment for a duration of time in which the sensor detects sensor signals that do not indicate an anomaly.

18. The system of claim 11, wherein the controller is further configured for:

during execution of the model, detecting an anomaly in the environment;

requesting confirmation of the detected anomaly;

repeating the training if the detected anomaly is not confirmed; and continuing to execute the model to detect anomalies if the detected anomaly is confirmed.

19. A non-transitory machine-readable medium, comprising executable instructions that, when executed by a processor, facilitate performance of operations, comprising:

receiving at a sensor node an indication to initiate training by the sensor node to detect anomalies in an environment based on sensor data generated by a sensor that resides on such sensor node and is operable to detect sensor signals from the environment;

after training is initiated, the sensor node automatically training a model that resides on the sensor to detect anomalies in the environment, wherein such training is based on the sensor data; and after the model is trained, executing by the sensor node the model to detect anomalies in the environment.

\* \* \* \* \*